United States Patent [19]

Ginn et al.

[11] 4,291,832
[45] Sep. 29, 1981

[54] SYSTEM POWERED RESET VELOCITY CONTROLLER

[75] Inventors: Le Roy D. Ginn; Le Royce S. Ginn, both of San Leandro; John C. Morris, Castro Valley; Dalny Travaglio, Kensington, all of Calif.

[73] Assignee: Universal Pneumatic Controls, Inc., San Leandro, Calif.

[21] Appl. No.: 36,823

[22] Filed: May 7, 1979

[51] Int. Cl.³ .............................................. F24F 7/06
[52] U.S. Cl. ................................. 236/49; 236/80 R
[58] Field of Search ..................... 236/49, 80 R, 80 B, 236/DIG. 11

[56] References Cited

U.S. PATENT DOCUMENTS

| | | | |
|---|---|---|---|
| 3,806,027 | 4/1974 | Ginn et al. | 236/49 |
| 3,924,651 | 12/1975 | Hippel et al. | 137/563 X |
| 3,941,310 | 3/1976 | Travaglio et al. | 236/49 |
| 4,007,873 | 2/1977 | Duchek | 236/49 |
| 4,041,173 | 8/1977 | Boyer et al. | 236/49 |
| 4,077,567 | 3/1978 | Ginn et al. | 236/49 |
| 4,130,132 | 12/1978 | Cote | 236/49 X |
| 4,141,496 | 2/1979 | Duchek | 236/49 |

Primary Examiner—William E. Tapolcai, Jr.
Attorney, Agent, or Firm—Donald C. Feix

[57] ABSTRACT

A variable air flow volume conditioned air distribution system of the kind having an air flow duct for supplying conditioned air to a room and a valve in the duct for regulating the volume of air flowing through the duct has a controller which senses the flow velocity in the duct and the room temperature in the room.

The controller combines a temperature signal with a flow velocity signal through a velocity spring. A temperature change resets the flow velocity set point and produces a corresponding change in the volume flow through the duct.

The controller includes an adjustable bias for the velocity spring for varying the rate of the velocity spring from a low spring rate for control at a low maximum permitted flow velocity in the duct to a higher spring rate for control at a higher permitted maximum flow velocity flow in the duct and vice versa.

8 Claims, 7 Drawing Figures

SYSTEM POWERED RESET VELOCITY CONTROLLER

CROSS REFERENCE TO RELATED APPLICATIONS

The system of the present invention is a variable volume system of the general kind disclosed in U.S. Pat. No. 3,806,027 to Ginn, et al; U.S. Pat. No. 3,934,795 to Ginn, et al; U.S. Pat. No. 4,039,124 to Ginn, et al; and U.S. Pat. No. 4,077,567 to Ginn, et al. Each of these patents is assigned to the same assignee as the present application.

BACKGROUND OF THE INVENTION

This invention relates to a variable volume conditioned air distribution system. It also relates to a controller for controlling the volume flow of conditioned air in a variable volume control system.

In variable volume systems the temperature of the air flowing through a duct is kept constant, and the heating or cooling requirements of the room are met by varying the volume of air flowing through the duct to the room.

Since the duct has a constant diameter, the volume of flow through the duct will be dependent upon the velocity of air flow within the duct.

The volume of air flow through the duct can by controlled by measuring the velocity of air flow and by positioning a valve member within the duct to produce a given flow velocity in response to a sensed temperature in the room.

A velocity spring has been used in control systems of this kind for producing a biasing force which determines the velocity set point for controlling the movable valve member in the air flow duct.

A temperature signal sensed by a thermostat in the room has also been used in combination with the bias provided by the velocity spring for resetting the control set point for the air flow velocity in response to changes in the room air temperature.

A smaller room requires less air flow than a large room for any given temperature condition in the room, and a single controller should be capable of providing, for all room sizes, a well controlled modulation of the volume of air flow to the room for all conditions of operation from zero flow to maximum air flow through the full range of room temperatures.

For a small room, the flow volume might vary from zero flow to a maximum flow volume corresponding to an air flow velocity pressure of 0.1 inch of water column. For a large room the volume of flow required might vary from zero to a maximum flow corresponding to 1.0 inch water column velocity pressure.

Controls constructed to provide a good modulation at the relatively high volume flow rates required for a large room have sometimes not been effective to provide good regulation of flow at the relatively low velocity pressures associated with a small room.

The problem of providing satisfactory control over the full range of volume flows can become particularly difficult when the variable air flow volume system is one which uses system air for powering all of the components of the control mechanism.

In such system powered variable air flow volume systems the maximum pressure available to the room thermostat to move a diaphragm in the controller can be 0.6 inch of water column. The force that can be generated by this pressure and lower pressures on the size of a diaphragm that is convenient to use in a controller mechanism can pose problems in positively positioning structure for resetting the set point of the velocity spring.

SUMMARY OF THE INVENTION

It is an important object of the present invention to construct a controller which can be used with a system powered variable air volume conditioned air system to provide effective modulation of flow volume for any size room.

In the controller of the present invention a movable control element is positionable to regulate the position of the valve in the duct, and the volume of air flowing in the duct is dependent upon the positioning of the movable control element.

The air flow velocity in the duct is sensed and is used to produce a flow velocity force whose magnitude varies with the velocity of flow in the duct. The flow velocity force is applied to the control element to move the control element in one direction.

A velocity spring is connected to the control element to apply a bias force to the control element in opposition to the flow velocity force and to thereby determine the air flow velocity set point of the controller.

The temperature in the room is sensed and is used to produce a temperature force whose magnitude varies with the sensed temperature.

This temperature force is applied to the velocity spring through a lever which provides a mechanical advantage for the temperature force over the velocity force and which insures that the force generated by the sensed temperature will always positively position the structure which is effective to reset the velocity set point with a change in sensed temperature.

The temperature responsive mechanism of the present invention is constructed to always move through the same distance for a given temperature change regardless of whether the controller is set to control at a low maximum permitted flow velocity in the duct or at a high maximum permitted flow velocity in the duct.

The rate of the velocity spring is varied by a bias adjustment mechanism which provides a low spring rate for control at a low maximum permitted flow velocity in the duct and which provides a higher spring rate for control at a higher permitted maximum flow velocity in the duct and vice versa.

In one particular embodiment of the present invention the velocity spring is a leaf spring, and the bias adjustment mechanism includes a movable end support for one end of the leaf spring for increasing and decreasing the effective length and rate of the spring with changes in the location of end support.

In a specific embodiment of the present invention the leaf spring is also shaped to provide a decrease in the effective width of the spring with an increase in the effective length of the spring.

In a specific embodiment of the invention the leaf spring also includes a separate leaf spring portion within the main body of the leaf spring. This separate leaf spring portion has a set which is effective to provide a small additional force for effective modulation at minimum flows during those conditions of operation when the effective length of the velocity spring is made short to provide a high spring rate for controlling a high maximum permitted air flow in the duct.

Variable air volume system apparatus and methods which incorporate the structures and techniques described above and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 2 is a side elevation view of the reset velocity controller used in the system shown in FIG. 1. FIG. 2 is taken generally along the line and in the direction indicated by the arrows 2—2 in FIG. 5. FIG. 2 is schematic in part to simplify the showing of the operation of the controller.

FIG. 3 is a fragmentary top plan view taken generally along the line and in the direction indicated by the arrows 3—3 in FIG. 2. FIG. 3 shows, in bold outline, the position of a movable end support for a velocity spring when the maximum flow velocity adjustment mechanism of the controller is set to provide a high maximum volume flow in the duct. FIG. 3 shows, in dashed outline, the position of an end support for the velocity spring when the maximum flow velocity adjustment mechanism of the controller is set to provide the lowest maximum volume flow in the duct.

FIG. 4 is a side elevation view like FIG. 2. FIG. 4 shows, in bold outline, the position of a lever mechanism when the temperature sensed by the thermostat is near the set point of the thermostat so as to require a minimum amount of cooling air flow from a cold air duct. FIG. 4 also shows, in dashed outline, the position of the lever mechanism when the thermostat calls for a maximum amount of cooling air flow from a cold air duct.

FIG. 5 is an exploded isometric view of the controller shown in FIGS. 2-4 and shows details of the maximum flow velocity adjustment mechanism for adjusting the bias of the velocity spring. FIG. 5 also shows details of the interconnection of the lever mechanism between the temperature sensor mechanism and the velocity spring.

FIG. 7 is a side elevation view of the velocity spring taken along the line and in the direction indicated by the arrow 7—7 in FIG. 6. FIG. 7 shows how the velocity spring is formed with a separate leaf spring portion having a set for providing controlled modulation of low flow velocities when the maximum flow velocity adjustment mechanism is set to provide a high maximum volume flow in the duct.

DESCRIPTION OF THE PREFERRED EMBODIMENTS

Figure 1:
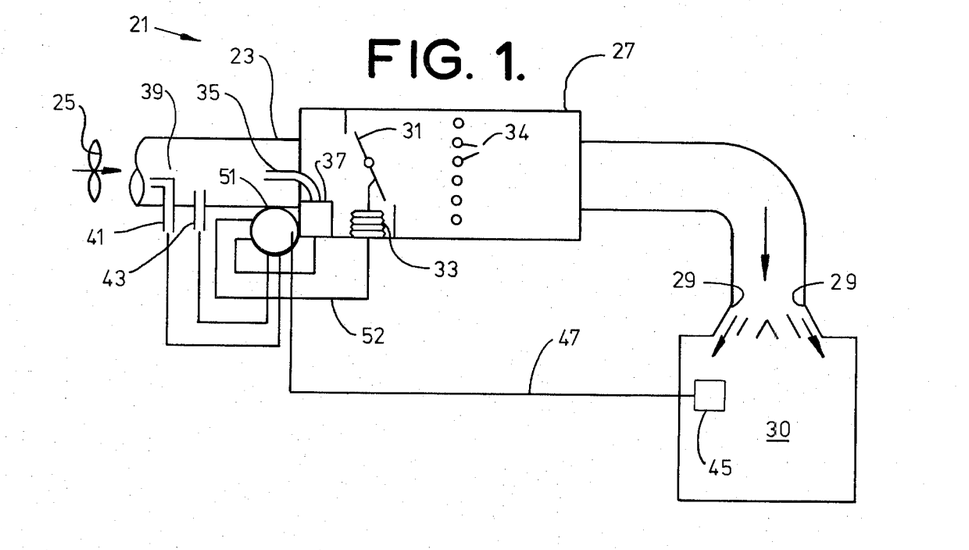
FIG. 1 is a side elevation view of a variable air volume conditioned air distribution system incorporating a reset velocity controller constructed in accordance with one embodiment of the present invention.

A variable air volume control system constructed in accordance with one embodiment of the present invention is indicated generally by the reference numeral 21 in FIG. 1.

The system 21 comprises a duct 23 (which may be a hot air duct or a cold air duct), a fan 25, a regulator box 27 and outlets 29 for conducting air from the duct 23 to a room 30.

In most installations the complete system 21 will include a number of branch ducts 23 with related regulator boxes 27 for supplying conditioned air to different zones of a building. However, only a single branch duct and regulator box and related room or zone 30 are shown in FIG. 1 in order to simplify the description of operation.

The volume of air flowing through the regulator box 27 is controlled by a valve 31 or other movable member, and the valve 31 is moved in opening and closing directions by an actuator 33.

The regulator box 27 normally contains a sound attenuator 34.

In the particular, specific embodiment of the invention described in detail below, the actuator 33 is a system powered actuator. That is, the power for the actuator 33 is obtained from the total pressure of the air flowing within the duct 23. However, other forms of actuators, such as pneumatic (using compressed air) or electrical powered actuators can be used.

In the embodiment illustrated in FIG. 1 an impact tube 35 picks up the actuating air at impact pressure for powering the actuator 33, and this air is filtered by a filter 37.

A flow measuring device 39 in the duct 23 comprises a pitot tube having a total pressure pickup probe 41 and a static air pressure pickup probe 43.

The temperature in the room 30 is sensed by a thermostat 45. The thermostat 45 has an adjustment knob 47 for setting the set point of the thermostat.

The thermostat 45, in a specific embodiment of the present invention to be described in detail below, is a direct acting thermostat which produces an output signal proportional to room temperature on a line 47.

Figure 2:
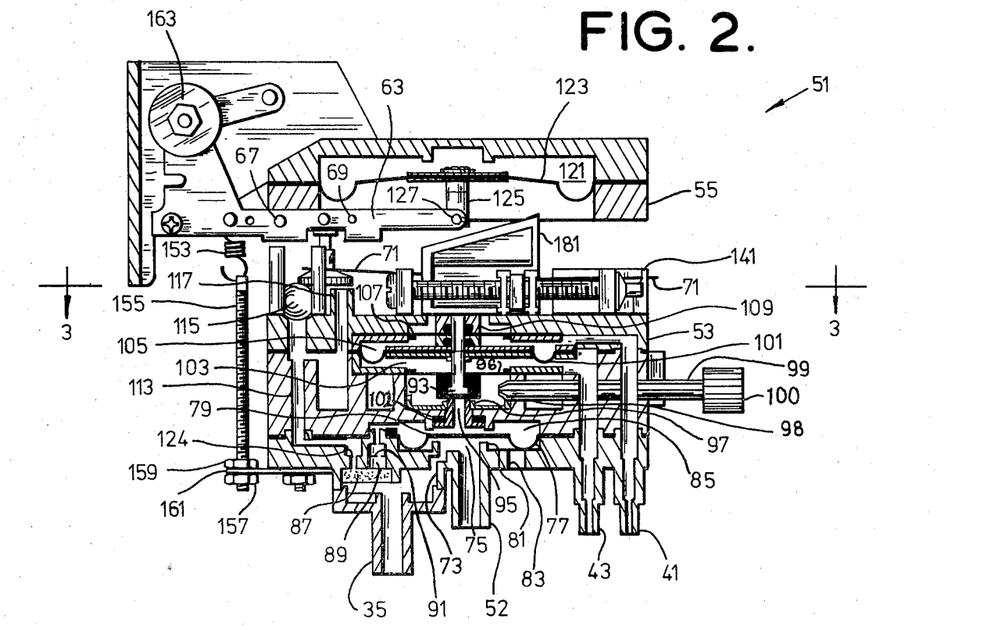
Figure 4:
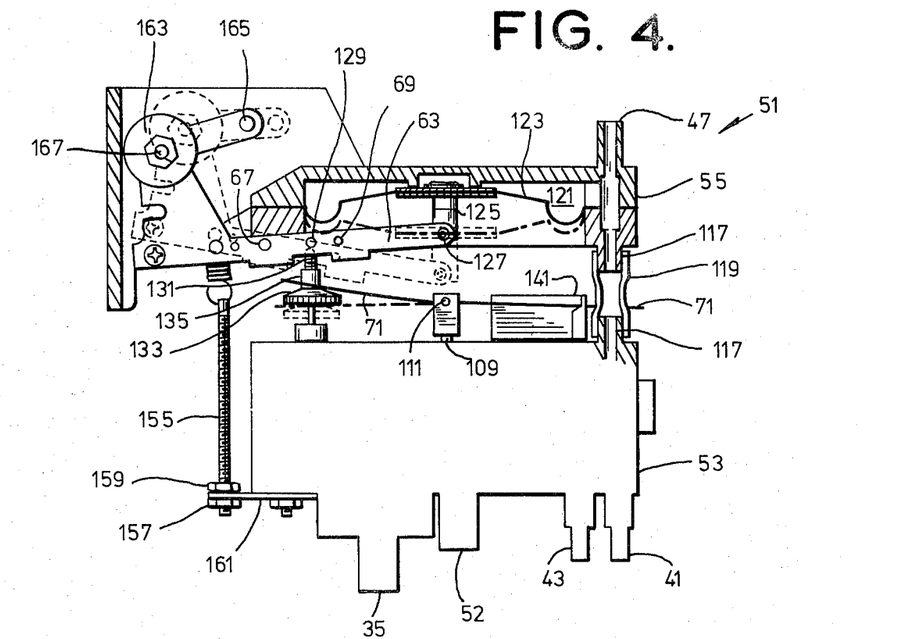
Figure 5:
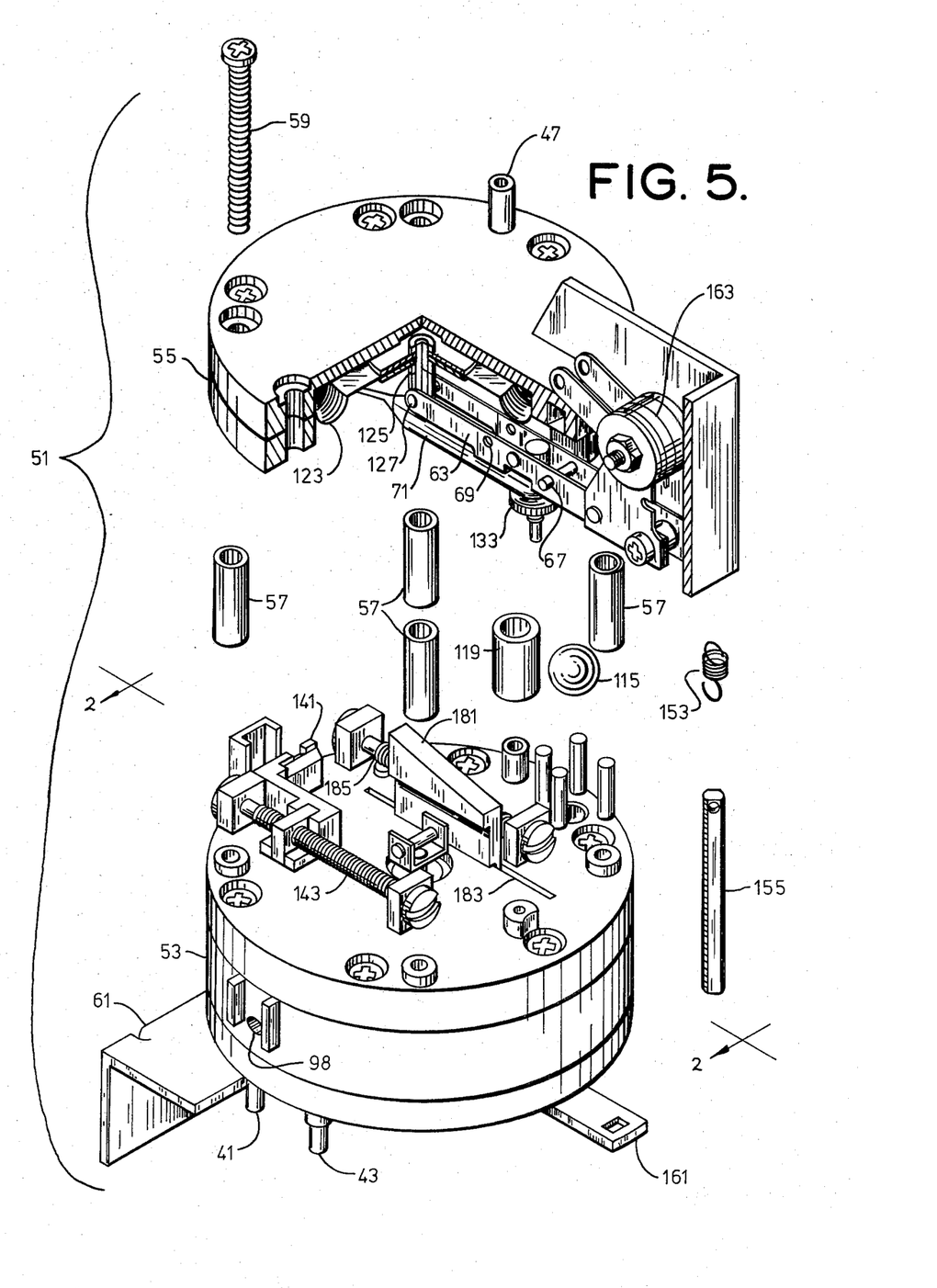
Figure 6:
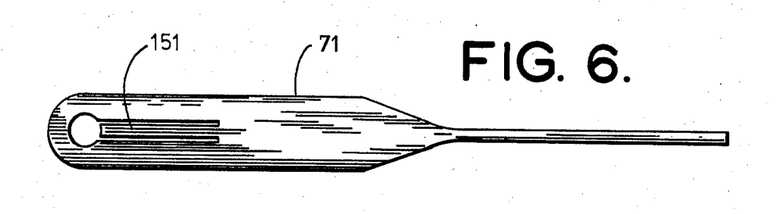
FIG. 6 is a top plan view of the velocity spring.

In the particular embodiment of the invention shown in the drawing the system 21 is a system powered conditioned air system in which the power for positioning the valve 31 is obtained from an impact tube 35 (as described above). In this embodiment the thermostat 45 produces an output signal in the line 47 to cause the valve 31 to go from full open to full closed with increasing sensed temperature in the room 30 when the duct 23 is used as a hot air duct (and when a lever 63, see FIGS. 2, 4 and 5, is connected in the controller 51 with the pivot point at 67 as illustrated in the drawings). The lever 63 and its other connections will be described in greater detail below.

The direct acting thermostat 45 produces a signal in the line 47 to cause the valve 31 to go from full closed to full open with increasing sensed temperature when the duct 23 is used as a cold air duct (and when the lever 63 is connected for pivoting at 67 as illustrated in FIGS. 2, 4 and 5).

As will also be described in greater detail below, the lever 63 is constructed to have another pivot point 69 to provide this same sequencing (from full open to full closed of the valve 31 with a hot air duct and then the sequencing from the full closed to full open of the valve 31 with a cold air duct with continually increasing temperature) when a reverse acting thermostat is used as the thermostat 45.

The alternate way in which the lever 63 can be connected permits the controller 51 to function as two different controllers.

In one form, with the lever 63 connected to the main frame of the module 51 for pivoting about the pin 67 as illustrated in the drawing, an increase of thermostat pressure in line 47 produces a decrease in the force on a velocity spring 71 (see FIGS. 2, 4, 5-7) to produce a decrease in flow in a hot duct and an increase in flow in a cold duct.

In the second case, with the lever 63 connected for pivoting movement on the main frame of the controller 51 at the pivot pin opening 69, an increase in thermostat pressure in the line 47 produces an increase in the force on the variable rate velocity spring 71 so that a reverse acting thermostat can be used to produce the same sequencing of the volume of air flow in a hot duct and in a cold duct with increasing room air temperature in room 30 as described above for the direct acting thermostat.

The specific co-action between the pressure produced by thermostat 45 and the action of the lever 63 on the velocity spring 71 will be described in greater detail below. At this point applicant wishes to point out that the alternate ways of connecting the lever 63 for pivoting action in the controller 51 accomplishes several things. It permits a cold duct and a hot duct to be operated in sequence with one single thermostat. It also permits a dead band to be provided between the cold duct and the hot duct (by adjusting at what point the thermostat starts to control the flow through each duct). A dead band between a cold duct and a hot duct is desirable and is specified in the new uniform code for air conditioning systems.

It should also be noted that controlling with a system powered control system uses the lowest control pressures and is the most difficult to do in terms of a control system operation. It is easier to operate a control system which uses compressed air, for example, 20 psi compressed air; and the variable air volume control system of the present invention can be used with compressed air as the power source. The present invention is not limited to the specific system powered embodiment shown in FIG. 1 and described in detail below.

It should also be noted that an electrical thermostat, rather than the fluid pressure type thermostat 45, can also be used to reset the variable rate spring 71 with a constant lift in accordance with the present invention.

In the system powered embodiment of the variable air volume control system shown in the drawings, the system 21 has a controller 51 for controlling the volume of air flow through the duct 23. The controller varies the pressure in a line 52 (see FIG. 1) extending from the controller 51 to the actuator 33 to position the valve 31 under the control of the controller 51.

The controller 51 is a reset velocity controller.

The maximum flow velocity permitted in the duct 23 can be adjusted to provide a relatively low maximum flow velocity (say, 0.1 inch water column) when the controller is associated with a duct flowing air to a relatively small room 30 which does not require large volume flows of air for the desired heating or cooling.

The maximum flow velocity permitted in the duct 23 can be adjusted to permit relatively high flow velocities (for example, 1.0 inch water column) when relatively high volume flows are required through the duct 23 to provide adequate heating or cooling for a large room or other space 30.

In addition the temperature sensing provided by the thermostat 45 is associated with the air flow velocity sensing provided by the flow measuring device 39 to reset the existing velocity set point within the controller 51 as the temperature changes in the room 30. This enables the controller 51 to re-position the valve 31 to provide the required change in air flow velocity and volume flow through the duct 23 to bring the temperature in the room 30 back to the selected temperature set point of the thermostat 45.

With reference now to FIGS. 2-5, the controller 51 comprises a lower module 53 and an upper module 55. The two modules are connected together by spacers 57 (see FIG. 5) and screws 59 so that the housings for the modules and the spacers and screws form a main frame for all of the operating components of the controller 51.

A mounting bracket 61 is connected to the lower module 53 for mounting the controller 51 at a desired location in the system 21, such as, for example, on the volume regulator box 27.

It should be noted that some features of the controller 51 are shown schematically in FIG. 2 for purposes of simplifying the illustration and description of the operation of the controller and therefore may not have exact correspondence with the same structural features as shown in other views of the drawing.

Referring now to FIG. 2, the impact air from the air flow duct 23 is brought into the controller 51 through the line 35.

This impact air flows upward (as viewed in FIG. 2), through a passageway 73 formed in a bottom plate of the lower module 53, to a chamber 75 formed beneath a flexible diaphragm 77. The pressure in the chamber 75 is transmitted to the actuator 33 (see FIG. 1) by the line 52.

The pressure in the chamber 75 is regulated by the position of a rigid central portion or disc 79 which forms a valve element in the central part of the diaphragm 77. The valve element 79 is movable toward and away from upstanding rim 81 which encircles the openings to the chamber 75 provided by the upper ends of the passageway 73 and the line 52. As the valve element 79 is moved toward the rim 81 more of the pressure of the impact air from the line 35 is transmitted to the actuator through the line 52. As the valve element 79 is moved upward and away from the rim 81 the pressure in the line 52 is decreased because more of the impact air pressure from the line 35 is permitted to be vented over the rim 81 and to atmosphere through an opening 83 formed in the bottom plate of the module 53.

With continued reference to FIG. 2, a chamber 85 is formed above the diaphragm 77. Pressurized air is conducted to this chamber 85 from the impact tube 35 through a filter 87 and a passageway 89 having a restrictor 91. The pressure in the chamber 85 is regulated by a valve element 93 which is vertically movable (as viewed in FIG. 2) toward and away from the upper end of a passageway 95 to increase and to decrease the pressure in the chamber 85 by bleeding less or more of the pressure from the passageway 95 to atmosphere through an opening 98 to atmosphere located beneath an isolation seal diaphragm 96.

The passageway 95 is formed within a sleeve having outside threads engaged by a ring gear 97. The ring gear 97 is seated and rotatable on a web section forming part of the frame of the module 53. The ring gear 97 is rotated by a pinion gear 99 to move the upper end of the passageway 95 upward and downward to permit the elimination of offset in the control. The pinion gear 99 is located at the end of a removable tool 100 which is insertable through the opening 98 to turn the ring gear. A seal 102 permits external adjustment of the sleeve containing the passageway 95 without leakage from the chamber 85 and without the need to disassemble the controller.

The position of the control element 93 is determined by the forces exerted on the control element 93 by an air flow velocity sensing diaphragm 101 and the variable rate velocity spring 71. The diaphragm 101 and spring 71 apply the forces to an arbor assembly 109 of which the control element 93 is a part.

The pressure in a chamber 103 beneath the diaphragm 101 is the static pressure in the air flow duct as transmitted through the line 43.

The pressure in the chamber 105 above the diaphragm 101 is the total air pressure in the air flow duct 23 as transmitted by the line 41.

An isolation seal diaphragm 107 extends across the top of the chamber 105 and is connected to the arbor assembly 109 for the valve element 93. The space above the isolation seal diaphragm 107 is vented to atmosphere.

As shown in FIG. 4 the arbor assembly 109 extends upwardly out of the lower module 53 and has a pin 111 which is engageable with the upper surface of the variable rate velocity spring 71. Thus, when the left hand end (as viewed in FIG. 4) of the spring 71 moves upwardly, the arbor assembly 109 and control valve element 93 are pulled upwardly against the force exerted by the air flow velocity sensing diaphragm 101 to move the valve element 93 upwardly and away from the orifice 95 to vent more of the pressure in the chamber 85 to atmosphere. This venting of pressure from the chamber 85 permits the disc 79 to move upward to vent more of the pressure in the chamber 75 and the line 52 to atmosphere. This lowers the pressure in the actuator 33 (see FIG. 1) to cause the air flow control valve 31 to move to a more open position to increase the volume of air flow to the room 30.

The pressure for powering the thermostat 45 is also obtained from the impact pressure pick up 35 in the specific system powered embodiment shown in the drawings.

Going back to FIG. 2, a passageway 113 in the lower module 53 connects to the line 35 after the filter 87. A ball check valve 115 normally closes off the upper end of the passageway 113, but the valve 115 can be moved upwardly against the weight of the ball 115 to vent the passageway 113 to atmosphere and to thereby regulate the maximum pressure which can be produced in the passageway 113.

A line 117 is teed into the passageway 113.

As shown in FIG. 4 the line 117 extends upwardly and is connected by a piece of flexible tubing 119 (as shown in FIG. 4) to a corresponding line 117 in the upper module 55. The line 117 in the upper module 55 is connected to a chamber 121 above a flexible diaphragm 123 in the upper module 55. The chamber 121 in the upper module is also connected by the line 47 to the thermostat 45 in the room 30 (see FIG. 1).

There are two restrictors in the flow path from the impact line 35 to the chamber 121.

In a specific embodiment of the invention the first restrictor is the restrictor 124 located at the inlet end of the passageway 113, and this restrictor 124 is a 0.020 inch restrictor. The purpose of this restrictor 124 is just to regulate the amount of air to the system so that the system doesn't run out of control.

The second restrictor is not illustrated in the drawings but is, in a specific embodiment of the present invention, a 0.007 inch restrictor located in the line 117. This second restrictor insures that the room thermostat 45 can bleed air out of the chamber 121 faster than the air can be supplied to the chamber 121 through the 0.007 inch restrictor.

The temperature sensing diaphragm 123 is connected, through an arbor assembly 125 and a pivot pin 127, to the right end (as viewed in FIG. 4) of the lever 63.

With a direct acting thermostat, the lever 63 is connected to the main frame of the controller 51 by a pivot pin 67.

The lever 63 is connected to the variable rate velocity spring 71 by a pin 129, and a linkage comprising an externally threaded shaft 131, and an adjustable nut 133.

As illustrated in FIG. 4 the adjustable nut 133 has a tapered upper surface which engages the underside of the left hand end (as viewed in FIG. 4) of the spring 71. The nut 133 also has a central sleeve portion 135 which extends upwardly through a related, generally circular opening 137 (see FIG. 3) of the spring 71.

The position of the nut 133 with respect to the threaded shaft 131 permits a calibration to be made either in the factory during assembly of the controller or at the time of installation of the controller 51.

The end of the spring 71 opposite that engaged by the nut 133 is supported by a movable support 141.

Figure 3:
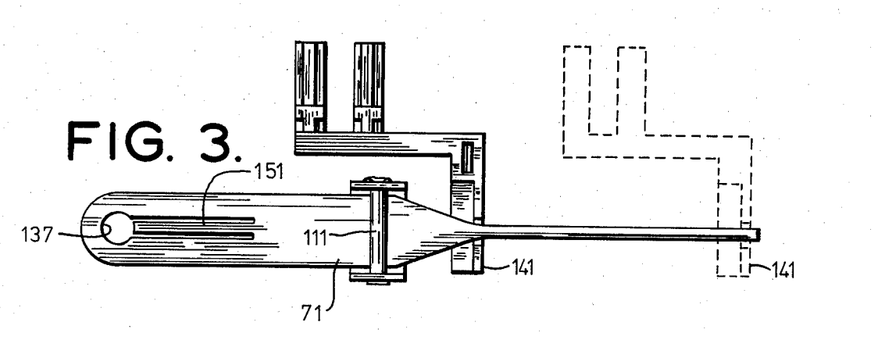

The support 141 is movable by a maximum velocity set point screw 143 (see FIG. 5) to move the support 141 within the range of maximum flow velocity set points shown by the bold outline and by the dashed outline positions illustrated in FIG. 3.

FIG. 3 shows, in bold outline, the position of the movable end support 141 when the maximum flow velocity adjustment mechanism of the controller 51 is set to provide a high maximum volume flow in the duct 23.

FIG. 3 shows, in dashed outline, the position of end support 141 for the velocity spring 71 when the maximum flow velocity adjustment mechanism of the controller 51 is set to provide the lowest maximum volume flow in the duct 23.

The movable end support 141 provides an adjustable bias for the velocity spring.

As best illustrated in FIG. 3, the spring 71 is a leaf spring and is shaped to provide a decrease in the effective width of the spring with an increase in the effective length of the spring as the end support 141 is moved from left to right as viewed in FIG. 3.

The movement of the end support 141 outwards (to the right as fiewed in FIGS. 3 and 4) also provides a decreasing mechanical advantage, through the leverage provided by the spring 71, for the effect of the temperature force over the effect of the flow velocity force as the effective length of the spring 71 is increased.

With the end support 141 shifted all the way to the outer end of the spring, as shown by the dashed outline in FIG. 3, the velocity spring 71 has a low spring rate for control at a low maximum permitted flow velocity in the duct.

When the movable end support 141 is shifted inwardly from the outermost position shown in FIG. 3, the rate of the spring is increased, because the effective length of the spring is decreased; and the highest spring rate is provided when the end support 141 is moved to the maximum inward position shown in bold outline in FIG. 3. At this position of the end support 141 the spring 71 has a high spring rate for control at a higher maximum permitted flow velocity in the duct.

A high spring rate is used for control when a relatively large volume of air flow is needed through the duct 23 for supplying conditioned air to a large room 30.

A low spring rate is used for providing accurate control of the flow of air through the duct 23 to a small room which requires only a relatively small amount of conditioned air under any condition of operation, for example, even when the thermostat 45 is calling for the maximum flow volume.

The combination of these features of the variable rate velocity spring 71, and the way that it is physically mounted in the control 51 provides a number of advantages.

First of all, these features permit controlling at very low velocity pressures with a spring that has a very low spring rate to give the control that is needed under conditions of low velocity pressures, such as a range from 0.0 inch of water column minimum flow to 0.1 inch of water column maximum flow.

Secondly, the temperature responsive arbor 125 is moved through a constant lift. In a specific embodiment of the present invention, the diaphragm 123 and arbor 125 move through a range of 0.3 inch travel whether it is controlling at 0.1 inch or 1.0 inch of water column velocity pressure in the duct 23.

In a specific embodiment of the control 51 as shown in FIGS. 2 and 3, the points of connection of the arbor 125, the linkage 131 and the pivotal connection to the main frame of the controller (whether at 67 or at 69) provide a four to one mechanical advantage through the lever 63 for the effect of the temperature responsive force applied to the end of the velocity spring 71 as compared to what would be the effect of the temperature responsive force if the arbor 125 were connected directly to the nut 133 without the lever 63.

Applying this temperature responsive force through the spring 71 to the arbor 109 produces more force on the arbor 109 when the spring 71 has a shorter length (and a related higher rate) than it does when the spring 71 has a longer length (and a related lower rate).

With the end support 141 at its outermost travel, the distance from the point of engagement of the end support 141 to the pin 111 is the same as the distance from the pin 111 to the point of engagement of the nut 133 with the other end of the spring 71 so that the spring acts as a one to one lever. When the end support 141 is moved all the way inward, the distance from the point of engagement of the nut 133 with the spring 71 to the pin 111 is four times as great as the distance from the pin 111 to the point of engagement of the end support 141 with the spring 71 so that the spring itself provides a four to one force mechanical advantage.

The mechanical advantages provided by the lever 63 and the spring 71 permit a control pressure in the chamber 121 to control a velocity pressure in the chamber 105 which is higher than the pressure in the chamber 121, and that is an important advantage, particularly in the case of a system powered control which can provide only relatively low pressures for the chamber 121.

Figure 7:
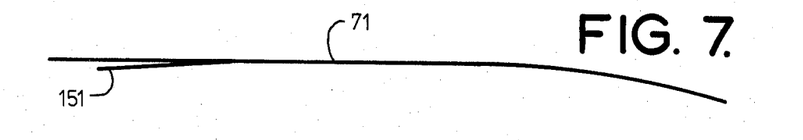

As best illustrated in FIG. 3 the end of the spring 71 which engages the nut 133 is formed with a separate leaf spring portion 151 within the main body of the leaf spring. This separate leaf spring section 151 has a set (as best shown in FIG. 7) which is effective to provide a small additional force for effective modulation at minimum flows during those conditions of operation when the effective length of the velocity spring is made short to provide a high spring rate for controlling at a high maximum permitted flow velocity in the duct. That is, when the spring 71 is set to provide high maximum flow velocities in the duct going up to 1.0 inch water column as sensed by the total pressure probe, and when the movable end support 141 is accordingly positioned inward to provide a high spring rate, the control from 1.0 inch down to about 0.1 inch water column can be accomplished with good control of the modulation; but the high rate spring characteristics can cause trouble in obtaining the desired modulation near close off of the valve 31. The leaf spring 151 with the set as shown in FIG. 7, is effective to provide the desired additional fine regulation at a lower spring rate during modulation at minimum flows from 0.1 inch to zero water column. At higher velocity pressures the leaf spring portion 151 drops out of the picture because the higher pressures force the nut 133 firmly up against the main part of the velocity spring 71 so that the only effective force exerted on the linkage 131 by the velocity spring 71 is that of the main body of the spring 71 which is applied at the high rate provided by the inward location of the end support 141.

An adjustable bias is provided for the lever 63 by a small spring 153 (see FIGS. 2, 4 and 5). A threaded rod 155, an adjustment nut 157, a locking nut 159 and a connecting flange 161 (see FIGS. 2 and 4) permit adjustment of the bias exerted by the spring 153 to provide staged operation of the control 51 at selected starting points.

Weights 163 (see FIGS. 2 and 4) can also be added to the end of the lever 63 in increments at points 165 and 167 to bring the control within the operating range of the thermostat pressure.

As noted above, the lever 63 has preformed openings 69 for connecting the lever 63 to the main frame of the controller 51 for either reversing the action of the thermostat or for permitting the controller 51 to operate in the exact manner as described in detail above but with a reverse acting thermostat.

The controller 51 includes a minimum velocity cam 181 having an inclined upper surface which is engagable with an extension of the pin 127 to limit the extend of downward movement of the arbor 125.

The cam 181 is shiftable within the track 183 (see FIG. 5) by an adjustment screw 185.

Thus, if a particular application requires a minimum volume of flow, as, for example, to meet minimum ventialtion requirements, the minimum velocity setting cam 181 is positioned to limit downward movement of the arbor 125 at a point which insures that the duct 23 will always flow at least this minimum volume of air to the room 30.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

We claim:

1. A controller for a variable air flow volume conditioned air distribution system of the kind having an air flow duct for supplying conditioned air to a room and a valve in the duct for regulating the volume of air flowing through the duct, said controller comprising, movable control element means for regulating the valve in the duct and the volume of air flowing in the duct in response to the positioning of the control element means, velocity sensing means for sensing the air flow velocity in the duct and connected to the control element means for applying a flow velocity force to the control element means in response to the sensed air flow velocity, velocity spring means connected to the control element means for applying a spring force to the control element means in opposition to the flow velocity force of the air flow velocity sensing means to determine the air flow velocity set point of the controller, room temperature sensing means for sensing the room temperature and for producing a temperature force in response to the sensed temperature and operatively associated with the velocity spring means, and bias adjustment means operatively associated with the velocity spring means for varying the rate of the velocity spring from a low spring rate for control at a low maximum permitted flow velocity in the duct to a higher spring rate for control at a higher maximum permitted flow velocity in the duct and vice versa and wherein the spring is a leaf spring and the bias adjustment means include a movable end support for one end of the leaf spring for increasing and for decreasing the effective length and the rate of the spring with changes in the location of the end support and including a first point of engagement between the room temperature sensing means and the velocity spring and a second point of engagement between the movable control element means and the velocity spring means and wherein the first and second points of engagement are so located with respect to the end support as to produce an increasing mechanical advantage through the leverage provided by the spring for the temperature force over the flow velocity force as the effective length of the spring is decreased.

2. A controller for a variable air flow volume conditioned air distribution system of the kind having an air flow duct for supplying conditioned air to a room and a valve in the duct for regulating the volume of air flowing through the duct, said controller comprising, movable control element means for regulating the valve in the duct and the volume of air flowing in the duct in response to the positioning of the control element means, velocity sensing means for sensing the air flow velocity in the duct and connected to the control element means for applying a flow velocity force to the control element means in response to the sensed air flow velocity, velocity spring means connected to the control element means for applying a spring force to the control element means in opposition to the flow velocity force of the air flow velocity sensing means to determine the air flow velocity set point of the controller, room temperature sensing means for sensing the room temperature and for producing a temperature force in response to the sensed temperature and operatively associated with the velocity spring means, and bias adjustment means operatively associated with the velocity spring means for varying the rate of the velocity spring from a low spring rate for control at a low maximum permitted flow velocity in the duct to a higher spring rate for control at a higher maximum permitted flow velocity in the duct and vice versa, including force multiplying means constructed to provide a mechanical advantage for the temperature force over the flow velocity force applied to the movable control element means, and wherein the controller includes a main frame and the force multiplying means include a lever having two possible points for pivotal connection to the frame so located that one of which pivot points may be used when a direct acting thermostat is associated with the controller and the other of which pivot points may be used when a reverse acting thermostat is used with the controller so that either type of thermostat can be used interchangeably merely by selecting the proper related pivot point and without changing any other structure or function of the controller and also so that one type of thermostat, either direct or indirect, can be used to provide one type of response for control of a hot duct and the opposite type of response for the control of a cold duct merely by selecting the related one of the two possible pivot points for connection of the lever to the frame of the controller.

3. A controller for a variable air flow volume conditioned air distribution system of the kind having an air flow duct for supplying conditioned air to a room and a valve in the duct for regulating the volume of air flowing through the duct, said controller comprising, movable control element means for regulating the valve in the duct and the volume of air flowing in the duct in response to the positioning of the control element means, velocity sensing means for sensing the air flow velocity in the duct and connected to the control element means for applying a flow velocity force to the control element means in response to the sensed air flow velocity, velocity spring means connected to the control element means for applying a spring force to the control element means in opposition to the flow velocity force of the air flow velocity sensing means to determine the air flow velocity set point of the controller, room temperature sensing means for sensing the room temperature and for producing a temperature force in response to the sensed temperature and operatively associated with the velocity spring means, and bias adjustment means operatively associated with the velocity spring means for varying the rate of the velocity spring from a low spring rate for control at a low maximum permitted flow velocity in the duct to a higher spring rate for control at a higher maximum permitted flow velocity in the dust and vice versa, including force multiplying means constructed to provide a mechanical advantage for the temperature force over the flow velocity force applied to the movable control element means, and including a first point of engagement between the force multiplying means and the velocity spring and a second point of engagement between the movable control element means and the velocity spring means and wherein the first and second points of engagement are so located with respect to the end support as to produce an increasing mechanical advantage through the leverage provided by the spring for the temperature force over the flow velocity force as the effective length of the spring is decreased whereby a smaller temperature force can control a higher flow velocity force.

4. A controller for a variable air flow volume conditioned air distribution system of the kind having an air flow duct for supplying conditioned air to a room and a valve in the duct for regulating the volume of air flowing through the duct, said controller comprising, movable control element means for regulating the valve in the duct and the volume of air flowing in the duct in response to the positioning of the control element means, velocity sensing means for sensing the air flow velocity in the duct and connected to the control element means for applying a flow velocity force to the control element means in response to the sensed air flow velocity, velocity spring means connected to the control element means for applying a spring force to the control element means in opposition to the flow velocity force of the air flow velocity sensing means to determine the air flow velocity set point of the controller, room temperature sensing means for sensing the room temperature and for producing a temperature force in response to the sensed temperature and operatively associated with the velocity spring means, and bias adjustment means operatively associated with the velocity spring means for varying the rate of the velocity spring from a low spring rate for control at a low maximum permitted flow velocity in the duct to a higher spring rate for control at a higher maximum permitted flow velocity in the duct and vice versa, and wherein the spring is a leaf spring and the bias adjustment means include a movable end support for one end of the leaf spring for increasing and decreasing the effective length and the rate of the spring with changes in the location of the end support and wherein the leaf spring includes a separate leaf spring portion within the main body of the leaf spring and having a set which is effective to provide a small additional force for effective modulation at minimum flows during those conditions of operation when the effective length of the velocity spring is made short to provide a high spring rate for controlling at a high maximum permitted flow velocity in the duct.

5. A controller for a variable air flow volume conditioned air distribution system of the kind having an air flow duct for supplying conditioned air to a room and a valve in the duct for regulating the volume of air flowing through the duct, said controller comprising, movable control element means for regulating the valve in the duct and the volume of air flowing in the duct in response to the positioning of the control element means, velocity sensing means for sensing the air flow velocity in the duct and connected to the control element means for applying a flow velocity force to the control element means in response to the sensed air flow velocity, velocity spring means connected to the control element means for applying a spring force to the control element means in opposition to the flow velocity force of the air flow velocity sensing means to determine the air flow velocity set point of the controller, room temperature sensing means for sensing the room temperature and for producing a temperature force in response to the sensed temperature and operatively associated with the velocity spring means, and bias adjustment means operatively associated with the velocity spring means for varying the rate of the velocity spring from a low spring rate for control at a low maximum permitted flow velocity in the duct to a higher spring rate for control at a higher maximum permitted flow velocity in the duct and vice versa, including force multiplying means constructed to provide a mechanical advantage for the temperature force over the flow velocity force applied to the movable control element means, and wherein the force multiplying means are connected to the velocity spring means to provide a constant lift at the point of connection of the force multiplying means to the velocity spring for a given temperature change in the room at each related maximum permitted flow velocity in the duct as set by the bias adjustment means.

6. The invention defined in claim 5 wherein the mechanical advantage is in the range of 4 to 1.

7. A method of controlling a variable air flow volume conditioned air distribution system of the kind having an air flow duct for supplying conditioned air to a room and of the kind in which a movable member in the duct regulates the volume of air flowing through the duct, said method comprising, positioning the movable member in the duct in response to the positioning of a movable control element in a controller, sensing the air flow velocity in the duct and applying by temperature sensing means a flow velocity force to the movable control element in response to the sensed air flow velocity, applying a spring force to the control element in opposition to the flow velocity force by velocity spring means to determine the air flow velocity set point, sensing the room air temperature and producing a temperature force dependent on the magnitude of the sensed temperature, applying the temperature force to the velocity spring means, and adjusting the rate of the velocity spring means from a low spring rate for control at a low maximum permitted flow velocity in the duct to a higher spring rate for control at a higher maximum permitted flow velocity in the duct and vice versa and connecting the temperature sensing means to the velocity spring means by a force multiplying linkage that coacts with the adjustment of the velocity spring means to permit the temperature sensing means to move a constant distance for a given temperature change at each related maximum flow velocity set point of the velocity spring means.

8. A controller for a variable air flow volume conditioned air distribution system of the kind having an air flow duct for supplying conditioned air to a room, a flow control valve in the duct for regulating the volume of air flowing through the duct, and a fluid powered actuator for positioning the valve, said controller comprising, control orifice means for regulating the pressure of the fluid to the actuator to control the position of the flow control valve, said control orifice means comprising an orifice and a movable valve element for regulating the pressure to the actuator in response to the positioning of the valve element with respect to the orifice, velocity sensing means for sensing the air flow velocity in the duct and connected to the valve element for applying a flow velocity force to the valve element in response to the sensed air flow velocity, velocity spring means connected to the valve element for applying a spring force to the valve element in opposition to the flow velocity force of the air flow velocity sensing means to determine the air flow velocity set point of the controller, room temperature sensing means for sensing the room temperature and for producing a temperature force in response to the sensed temperature and operatively associated with the velocity spring means, and orifice adjustment means for moving the orifice toward and away from the valve element to eliminate offset in the controller, and seal means associated with the orifice adjustment means for permitting external adjustment of the orifice adjustment means without disassembly of the controller.

* * * * *